UNITED STATES PATENT OFFICE.

E. W. CLARK, OF HARTFORD, CONNECTICUT.

IMPROVED SOLUTION FOR THE TREATMENT OF WOOD.

Specification forming part of Letters Patent No. 94,869, dated September 14, 1869.

*To all whom it may concern:*

Be it known that I, E. W. CLARK, of the city and county of Hartford, in the State of Connecticut, have invented or discovered a new and useful Solution for the Treatment of Wood; and I do hereby declare that the following is a full, clear, and exact description of the same.

The solution which forms the subject of my discovery or invention has for its object the prevention of decay in wood, and operates as a general preservative, also largely contributes to give a fire and water proof character to said material. The same may be used with great benefit wherever there is exposure of the surface of the wood to air, moisture, or fire, as, for instance, on roofs or shingled surfaces, planks for drains or cellar-floors, post bottoms or ends, and a variety of other wooden articles or surfaces.

Although the proportions may be more or less varied and different ingredients added, the following clearly describes how the solution is or may be made and applied:

To fifty (50) gallons of water, I add, collectively or indiscriminately as regards order, one (1) pound of corrosive sublimate, five (5) pounds of the sulphate of iron, and five (5) pounds of sulphate of zinc, and stir or mix, and allow to remain until the last three ingredients are dissolved, which will be in the course of ten or twelve hours, more or less.

The dissolution may be greatly facilitated by first mixing said last-mentioned ingredients in a few gallons of heated water, and afterward adding more water to make up the quantity hereinbefore named.

Vessels of copper or brass, or an ordinary tight cask, may be used for preparing the solution in.

Said solution may be applied to the surface of the wood to be treated—as, for instance, in the case of a roof made of shingles—by washing the roof over until thoroughly saturated with the solution through or by means of an ordinary whitewash-brush; or the shingles, while in the bundle, may be saturated by immersing them in the solution. Post bottoms or ends to be treated should have the solution thus applied—that is, they should be dipped.

Whenever it is desirable to give additional protection against fire to wood treated with the within-described preservative solution, the same, after being well saturated with the latter and allowed to dry—say after the intermission of a day or two, more or less—may be washed over with slaked lime and salt, formed by making the slaked lime of the consistency of whitewash, and to one cask of fifty (50) gallons of said lime adding four (4) quarts of salt. To this after-wash, which is distinct from the subject-matter of my invention, although it may be used as a subsequent auxiliary, any suitable coloring matter may, if desired, be added.

What is here claimed, and desired to be secured by Letters Patent, is—

The solution for the preservation of wood composed of the ingredients specified, in or about in the proportions set forth.

E. W. CLARK.

Witnesses:
 EDWARD A. KUNKEL,
 HENRY E. SPENCER.